(12) United States Patent
Chu (10) Patent No.: US 8,205,316 B2
(45) Date of Patent: Jun. 26, 2012

(54) METHOD FOR FASTENING A CORD LOCK DEVICE ON A FABRIC

(75) Inventor: Kuo-An Chu, Taipei (TW)

(73) Assignee: Nifco Taiwan Corporation, Taipei (TW)

( * ) Notice: Subject to any disclaimer, the term of this patent is extended or adjusted under 35 U.S.C. 154(b) by 158 days.

(21) Appl. No.: 12/857,568

(22) Filed: Aug. 17, 2010

(65) Prior Publication Data

US 2012/0042498 A1 Feb. 23, 2012

(51) Int. Cl.
*B21D 39/00* (2006.01)
*F16G 11/00* (2006.01)

(52) U.S. Cl. .............. 29/453; 29/525.01; 29/525.02; 24/115 G (58) Field of Classification Search .............. 29/453, 29/525.01, 525.02; 24/115 H, 115 K, 115 G
See application file for complete search history.

(56) References Cited

U.S. PATENT DOCUMENTS

| 5,657,513 | A | * | 8/1997 | Takahashi | 24/115 G |
| 5,671,508 | A | * | 9/1997 | Murai | 24/115 K |
| 6,675,446 | B2 | * | 1/2004 | Buettell | 24/122.6 |
| 2009/0064473 | A1 | * | 3/2009 | Chan | 24/712.5 |

* cited by examiner

*Primary Examiner* — Jermie Cozart
(74) *Attorney, Agent, or Firm* — Li&Cai Intellectual Property (USA) Office (57) ABSTRACT

A method for fastening a cord lock on a fabric is provided. The method includes the following steps: (a) providing a cord lock with at least one through hole in which at least one cord may pass, wherein the cord lock has an inner lateral wall extended upwards from a lower surface thereof to an inner surface thereof to define a recess portion; (b) providing a buckling element, wherein the buckling element has a protrusion protruded upwards from an outer surface thereof; (c) disposing the buckling element on the fabric via the protrusion passing an aperture of the fabric; and (d) fastening the cord lock onto the buckling element and the fabric via the protrusion received in the recess portion.

6 Claims, 9 Drawing Sheets

FIG. 6 providing a cord lock with at least one through hole in which at least one cord may pass, wherein the cord lock has an inner lateral wall extended upwards from a lower surface thereof to an inner surface thereof to define a recess portion — 41 providing a buckling element, wherein the buckling element has a protrusion protruded upwards from an outer surface thereof — 43 disposing the buckling element on the fabric via the protrusion passing an aperture of the fabric — 45 fastening the cord lock onto the buckling element and the fabric via the protrusion received in the recess portion — 47

METHOD FOR FASTENING A CORD LOCK DEVICE ON A FABRIC

BACKGROUND OF THE INVENTION

1. Field of the Invention

The present invention relates to a fastening method for a cord lock device; in particular, the invention relates to a method for fastening a cord lock device on a fabric.

2. Description of the Related Art

As a result of the improvement of the quality of life, people put more attention on their appearance. In different types of clothes, there are different decorations, knots, and cord lock disposed on clothes, or sewing on a backpack, it depends on a user's special purpose.

Unfortunately, the cord lock still has several problems to be solved. For example, the cord lock may sway when a wearer is in activities. In that instant, if anyone is around the wearer, one's face or eyes may get hurt by the swaying cord lock. In other situations, the cord lock on the clothes may catch something accidentally and make it fall from the table regardless. In view of this, it is highly desirable to provide a cord lock device and the fastening method thereof, which are capable of connecting the cord lock onto the fabric and preventing the cord lock from swaying freely.

Based on research, the inventor proposes the present invention to address the above issues.

SUMMARY OF THE INVENTION

The object of the instant disclosure is to provide a method for fastening a cord lock device, which makes the cord lock device to be disposed on a fabric, thereby the cord lock is connected with the fabric.

The fastening method of the present invention comprises the following steps: (a) providing a cord lock with at least one through hole in which at least one cord may pass, wherein the cord lock has an inner lateral wall extended upwards from a lower surface thereof to an inner surface thereof to define a recess portion; (b) providing a buckling element, wherein the buckling element has a protrusion protruded upwards from an outer surface thereof; (c) disposing the buckling element on the fabric via the protrusion passing an aperture of the fabric; and (d) fastening the cord lock onto the buckling element and the fabric via the protrusion received in the recess portion.

The instant disclosure has following benefits: due to the cord lock device comprises a cord lock with a recess portion and a buckling element with a protrusion, which are formed correspondingly, so that the cord lock can be buckled with the buckling element. As compared to the conventional cord lock, the cord lock device of instant disclosure can be fixed on the fabric. Therefore, the disadvantage of cord lock swinging can be improved In order to further appreciate the characteristics and technical contents of the present invention, references are hereunder made to the detailed descriptions and appended drawings in connection with the present invention. However, the appended drawings are merely shown for exemplary purposes, rather than being used to restrict the scope of the present invention.

DETAILED DESCRIPTION OF THE PREFERRED EMBODIMENT

Figure 1:
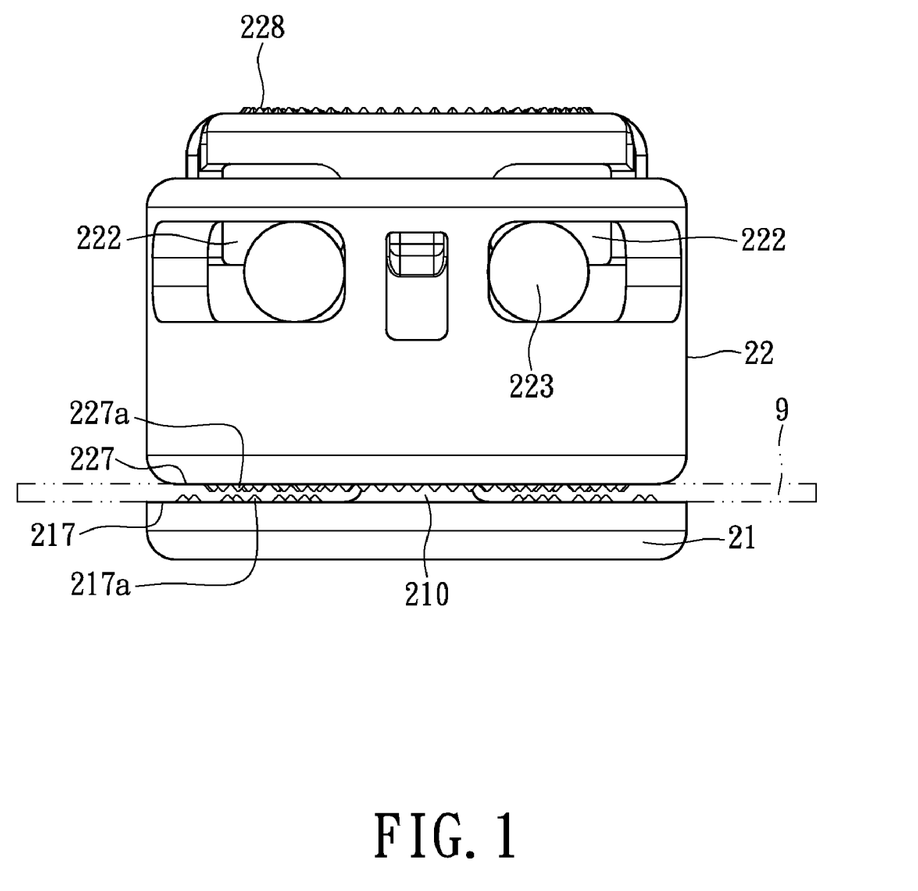
FIG. 1 shows a front elevational view of a cord lock device to the first embodiment of the present invention.
Figure 2:
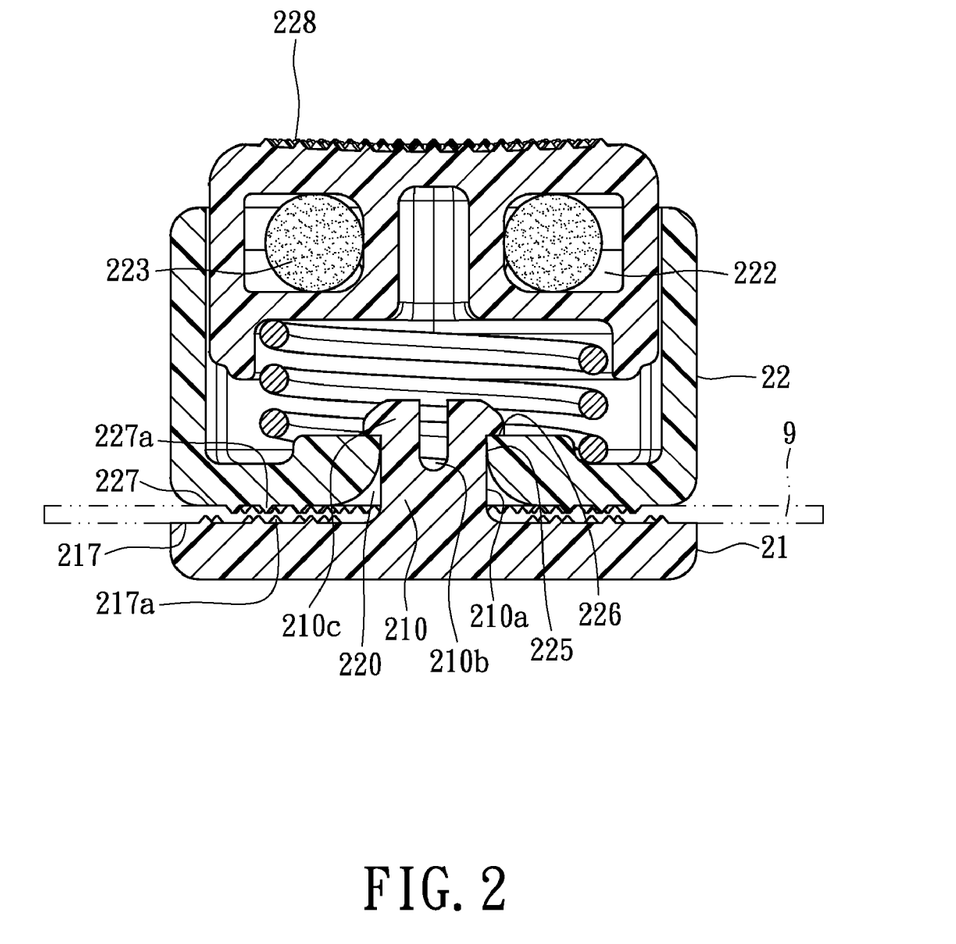
FIG. 2 shows a cross-sectional view of a cord lock device to the first embodiment of the present invention.
Figure 3:
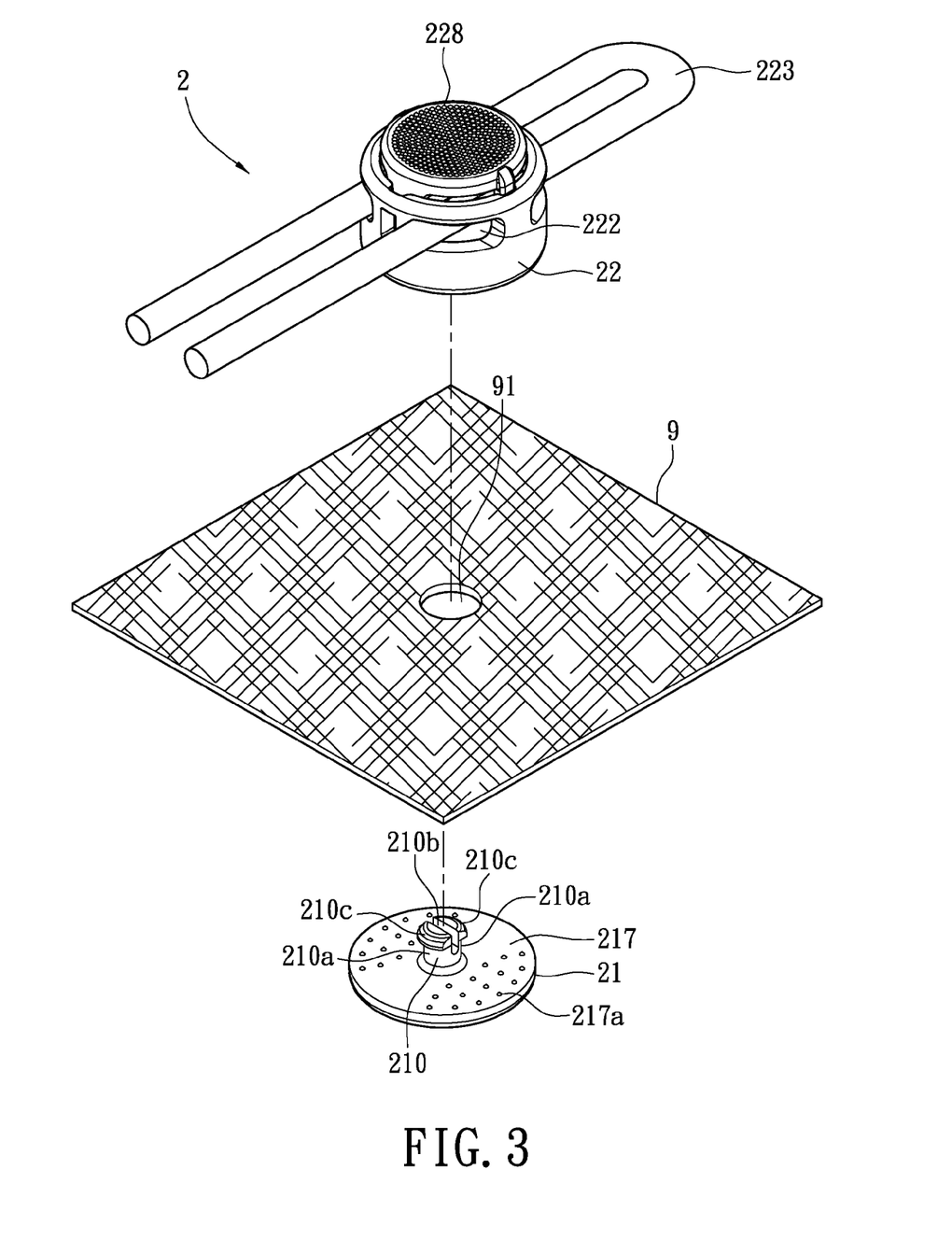
FIG. 3 shows a schematic exploded view of a cord lock device to the first embodiment of the present invention.

Referring to FIGS. 1 to 3, a cord lock device 2 is provided by the instant disclosure. The cord lock device 2 comprises a buckling element 21 and a cord lock 22. The buckling element 21 is disposed on a fabric 9, and the fabric 9 may be clothes, bags, backpacks and so on. The buckling element 21 comprises a protrusion 210 and an outer surface 217. The protrusion 210 extends from the outer surface 217 of the buckling element 21, and usually passes through an aperture 91 on the fabric 9, for fastening onto the fabric 9 more securely. In the preferred embodiment, the protrusion 210 passes through the fabric 9, whereas the buckling element 21 and the fabric 9 could be mounted in different other ways, which are not to be limited herein. The cord lock 22 comprises at least one through hole 222 and a recess portion 220, and has a cord 223 passing through the at least one through hole 222. It should be noted herein that the amount of the through hole 222 may be varied with different kinds of manufactured products, preferably, the at least one through hole 222 may be one through hole or two through holes, and the at least one cord 223 may be one cord or two cords, which are not to be limited herein. Further, the recess portion 220 is formed corresponding to the contour of the protrusion 210. Thereby, when the protrusion 210 is received in the recess portion 220, the cord lock 22 is adapted to buckle with the buckling element 21, and then, the cord lock 22 and the fabric 9 meet a connected condition.

Please referring to FIGS. 1 to 3 again, there is shown the first embodiment of the instant disclosure. The cord lock 22 has two through holes, and the two ends of the cord 223 are adapted to pass through the two through holes 222, and present a U-shape. The protrusion 210 comprises two side walls 210a and a groove 210b, and the groove 210b is defined by the two side walls 210a. Furthermore, each of the side walls 210a has a snap-fit end 210c disposed on an outer end of each of the side walls 210a respectively. The side walls 210a and the snap-fit end 210c of the instant disclosure are constituted by elastic materials, which can be deformed by a thrusting force. The width of the two snap-fit ends 210c is wider than the width of the recess portion 220. As shown in figure, if a user wants to make the cord lock 22 to buckle with the buckling element 21, the width of the recess portion 220 may restrict the protrusion 210 from entering into the recess portion 220 because of the wider width of the two snap-fit ends 210c. Therefore, when the protrusion 210 is received in the recess portion 220, the snap-fit ends 210c and side walls 210a are adapted to be deformed towards the groove 210b and forced entering the recess portion 220. After the protrusion 210 is received in the recess portion 220, the snap-fit ends 210c are adapted to protrude out of the recess portion 220 and buckled on an inner surface 226 of the cord lock 22. In that instant, the two side walls 210a go back to the position before deformation. Then, the protrusion 210 and the recess portion 220 can be buckled together more securely.

The cord lock 22 comprises a lower surface 227, and the lower surface 227 is opposite to the outer surface 217. The cord lock 22 has a plurality of convex dots 227a formed on the lower surface 227. Similarly, the buckling element 21 has a plurality of convex dots 217a formed on the outer surface 217. When the cord lock 22 and the buckling element 21 are buckled together, the convex dots 227a of the cord lock 22 is adapted to be against to the convex dots 217a of the buckling element 21 in order to make the buckling element 21 and the cord lock 22 buckled more securely. Furthermore, when the cord lock 22 is subjected to a tangential force, a relative rotation would be occurred in the cord lock 22 through the buckling element 21, but with this arrangement, the phenomenon can be avoided. The cord lock 22 further comprises an upper surface 228 opposite to the lower surface 227, and the upper surface 228 is a non-flat surface, normally a coarse surface or a wavy surface. Therefore, the friction between the user's fingers and the cord lock 22 can be enhanced so as to prevent the use's fingers from departing from the cord lock 22 easily during the operation.

Figure 4:
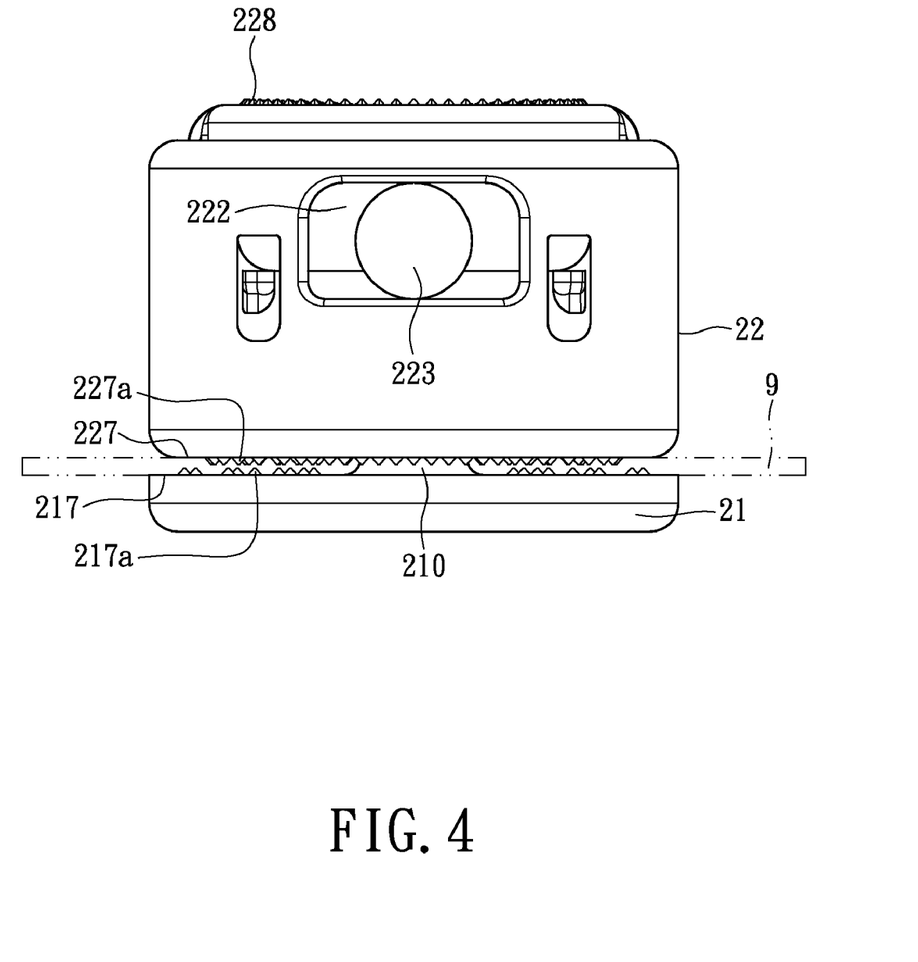
FIG. 4 shows a front elevational view of a cord lock device to the second embodiment of the present invention.
Figure 5:
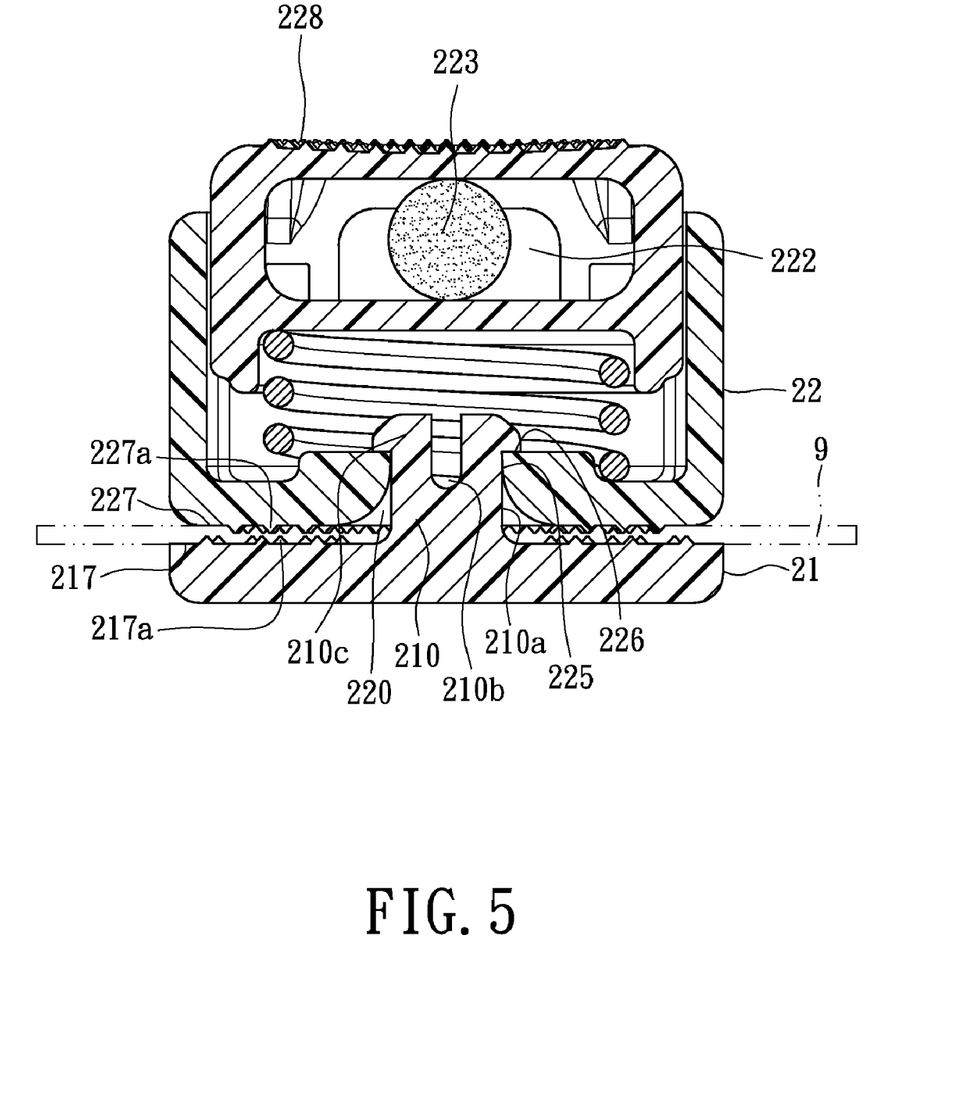
FIG. 5 shows a cross-sectional view of a cord lock device to the second embodiment of the present invention.
Figure 6:
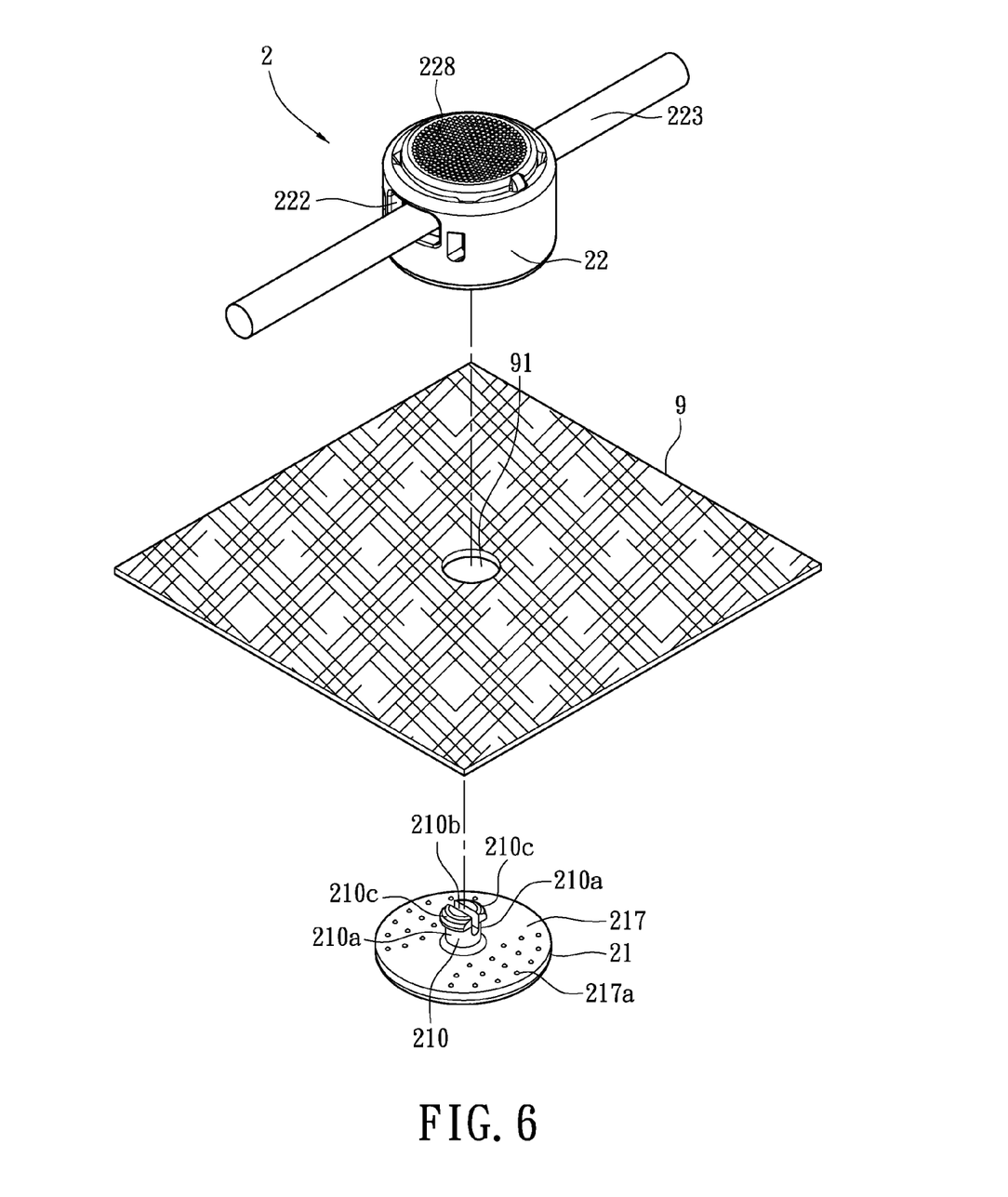
FIG. 6 shows a schematic exploded view of a cord lock device to the second embodiment of the present invention.

Referring to FIGS. 4 to 6, there is shown the second embodiment of the instant disclosure. The difference between the first embodiment and the second embodiment is the cord lock 22 of the cord lock device 2 comprises a through hole 222 in the second embodiment, and the cord 223 of the cord lock 22 is adapted to pass through the through hole 222. Other detailed structures are the same with the first embodiment, which are not to be mentioned herein. In other examples, the position of the recess portion and the protrusion may be varied, for example, the recess portion may be formed on the buckling element and the cord lock may comprise a protrusion formed corresponding to the recess portion. When the protrusion is received in the recess portion, the cord lock is adapted to be buckled with the buckling element. All these equivalent modifications still fall within scope of the claims of the instant disclosure.

Referring to FIGS. 1 to 7C, the instant disclosure also provides a method for fastening a cord lock device 2 on a fabric 9. In step 41, a cord lock 22 is provided, and the cord lock 22 has at least one through hole 222 in which at least one cord 223 may pass, wherein the cord lock 22 has an inner lateral wall 225 extended upwards form a lower surface 227 thereof to an inner surface 226 thereof to define a recess portion 220. In step 41, the at least one through hole 222 preferably may be one through hole or two through holes, and the at least one cord 223 may be one cord or two cords (described as the first embodiment and the second embodiment of the instant disclosure respectively). Therefore, the amount of the through holes and the cords are not to be limited herein.

Figure 7A:
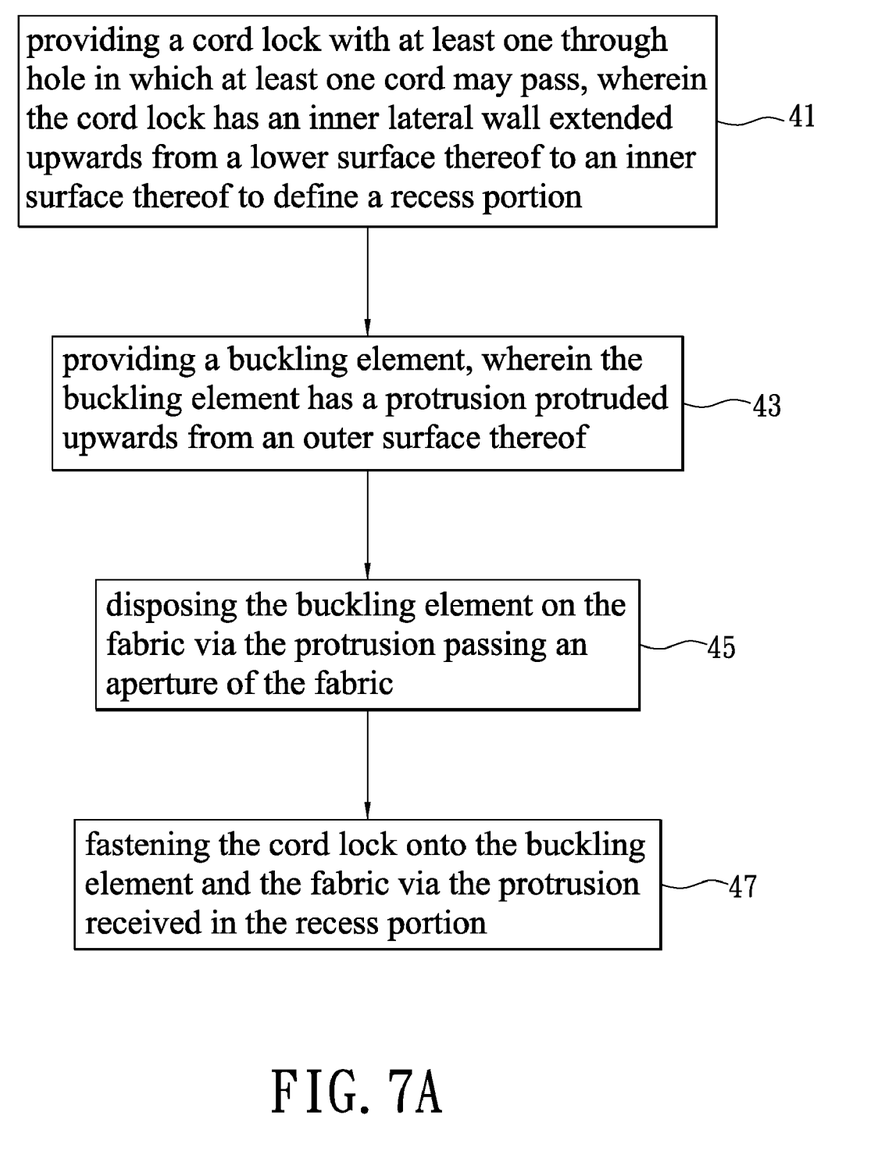
FIG. 7A shows a flowchart of the method for fastening a cord lock device on a fabric according to the present invention.
Figure 7B:
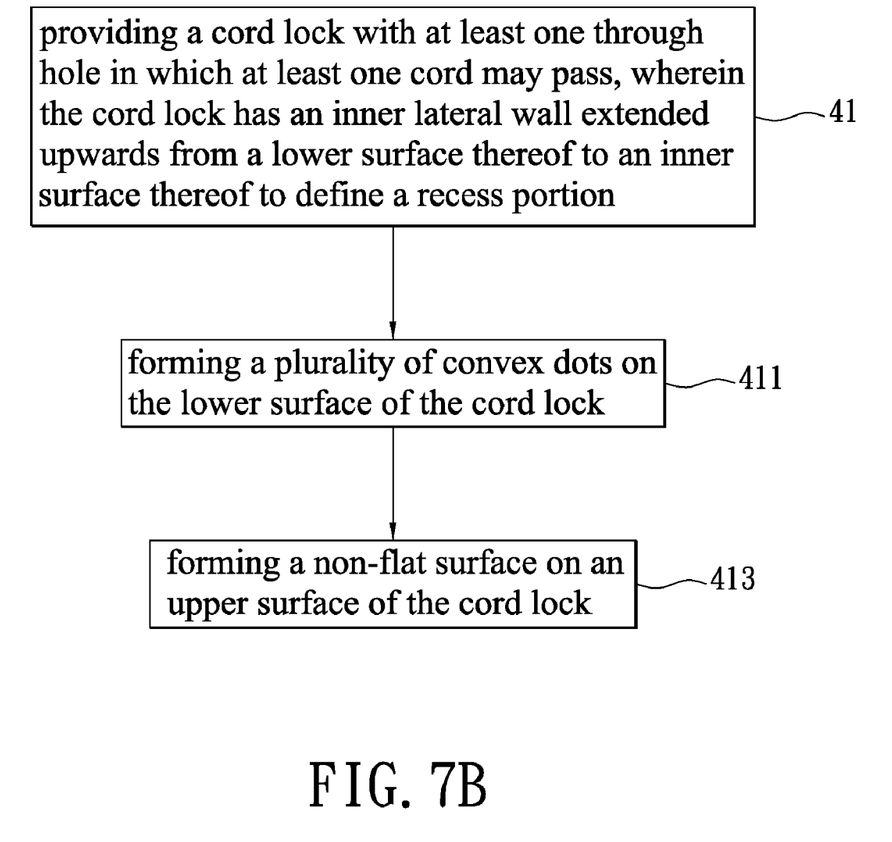
FIG. 7B shows a flowchart of the method for fastening a cord lock device on a fabric according to the present invention.
Figure 7C:
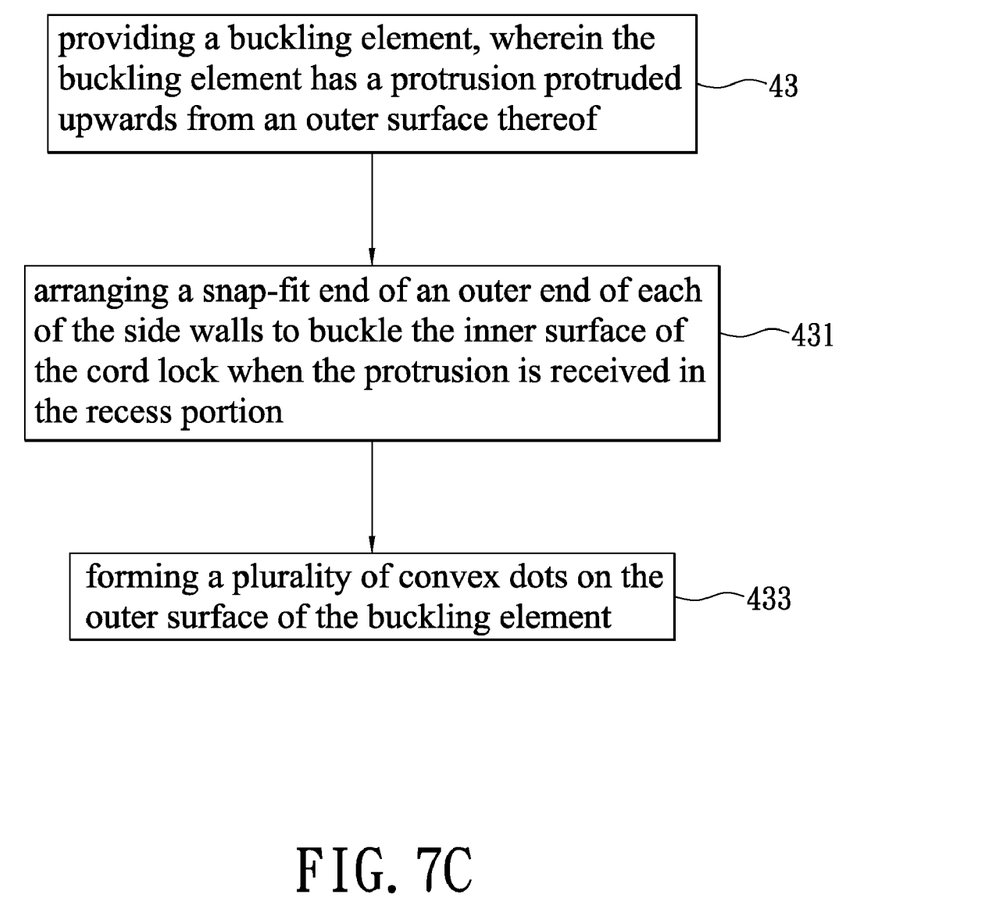
FIG. 7C shows a flowchart of the method for fastening a cord lock device on a fabric according to the present invention.

Subsequent to step 41, the detailed procedure of forming the cord lock 22 is as follows: in step 411, forming a plurality of convex dots 227a on the lower surface 227 of the cord lock 22, in step 413, forming a non-flat surface on an upper surface 228 which is opposite to the lower surface 227. With this arrangement, the friction between the user's fingers and the cord lock 22 can be enhanced so as to prevent the user's fingers from departing from the cord lock 22 easily during the operation.

In step 43, a buckling element 21 is provided, wherein the buckling element 21 has a protrusion 210 protruded upwards from an outer surface 217 thereof. Further, the protrusion 210 comprises two side walls 210a to form a groove 210b, in other words, the groove 210b is adapted to be defined by the two side walls 210a. Subsequent to step 43, the detailed procedure of forming the buckling element 21 is as follows: in step 431, a snap-fit end 210c is disposed on an outer end of each of the side walls 210a respectively. In that instant, the snap-fit end 210c of the buckling element 21 is hooked with the inner surface 226 of the cord lock 22. In step 433, a plurality of convex dots 217a are formed on the outer surface 217.

Then, in step 45, the buckling element 21 is disposed on the fabric 9 via the protrusion 210 passing an aperture 91 of the fabric 9. Thus, the manufacturer may combine with other slice method like adhesion, closing, clamping, sewing and so on, in order to fasten the buckling element 21 onto the fabric 9 more securely.

And then, in step 47, the cord lock 22 is fastened to the buckling element 21 and the fabric 9 via the protrusion 210 received in the recess portion 220. When the protrusion 210 is received in the recess portion 220, each of the snap-fit ends 210c is adapted to protrude out of the recess portion 220. The convex dots 217a on the outer surface 217 are adapted to be against to the convex dots 227a on the lower surface 227 so as to make the buckling element 21 and the cord lock 22 buckled more securely. Therefore, when the cord lock 22 is subjected to a tangential force, a relative rotation occurred in the cord lock 22 through the buckling element 21 can be avoided.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A method for fastening a cord lock device on a fabric, comprising the following steps of:
(a) providing a cord lock with at least one through hole in which at least one cord may pass, wherein the cord lock has an inner lateral wall extended upwards from a lower surface thereof to an inner surface thereof to define a recess portion;
(b) providing a buckling element, wherein the buckling element has a protrusion protruded upwards from an outer surface thereof;
(c) disposing the buckling element on the fabric via the protrusion passing an aperture of the fabric; and
(d) fastening the cord lock onto the buckling element and the fabric via the protrusion received in the recess portion.

2. The method as claimed in claim 1, wherein the step (a) comprises the following step of:
(a1) forming a plurality of convex dots on the lower surface of the cord lock.

3. The method as claimed in claim 1, wherein the step (a) comprises the following step of:
(a2) forming a non-flat surface on an upper surface of the cord lock.

4. The method as claimed in claim 1, wherein the protrusion comprises two side walls to form a groove.

5. The method as claimed in claim 4, wherein the step (b) comprises the following step of:
(b1) arranging a snap-fit end of an outer end of each of the side walls to buckle the inner surface of the cord lock when the protrusion is received in the recess portion.

6. The method as claimed in claim 5, wherein the step (b) comprises the following step of:
(b2) forming a plurality of convex dots on the outer surface of the buckling element.

* * * * *